Figure 1:
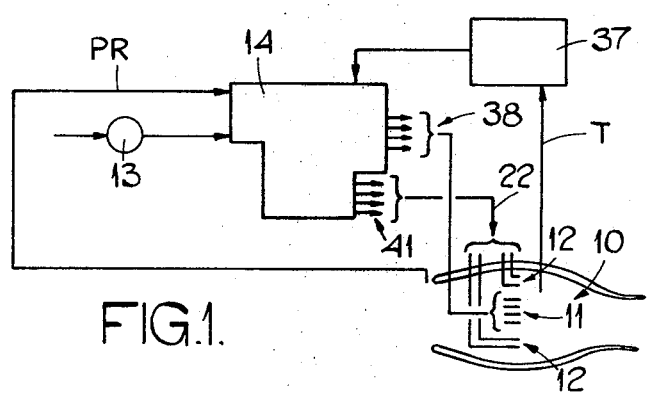

United States Patent [19]

Lewis et al.

[11] 4,272,957
[45] Jun. 16, 1981

[54] FUEL CONTROL SYSTEM FOR A RAM JET ENGINE

[75] Inventors: Geoffrey A. Lewis, Solihull; Arthur L. Lloyd, Wolverhampton, both of England

[73] Assignee: Lucas Industries Limited, Birmingham, United Kingdom

[21] Appl. No.: 956,416

[22] Filed: Oct. 31, 1978

[30] Foreign Application Priority Data

Nov. 5, 1977 [GB] United Kingdom ............... 46135/77

[51] Int. Cl.³ ............................................. F02K 7/10
[52] U.S. Cl. .................................... 60/243; 60/270 R
[58] Field of Search .............. 60/39.28 R, 243, 270 R; 137/625.48

[56] References Cited

U.S. PATENT DOCUMENTS

| | | |
|---|---|---|
| 3,037,350 | 6/1962 | Cowles et al. ................. 60/39.28 R |
| 3,630,029 | 12/1971 | Smith ...................................... 60/243 |
| 3,714,784 | 2/1973 | Glaze et al. ............................ 60/243 |
| 3,777,483 | 12/1973 | Lewis ..................................... 60/243 |
| 3,824,786 | 7/1974 | Skinner .................................. 60/243 |

Primary Examiner—Robert E. Garrett

[57] ABSTRACT

A fuel control system for a ram jet engine has a metering orifice 20 controlled by a portion 18 of a stem 17 in accordance with an engine air pressure signal PR, for regulating flow to the main burners of the engine. A further metering orifice 21 downstream of the orifice 20 is controlled by a portion 19 of the stem 17 and regulates flow to the engine pilot burners. Main burner flow is additionally controlled by a valve 30 responsive to engine temperature. The arrangement is such that pilot burner flow is maintained substantially stoichiometric even when main burner flow shuts down in response to a temperature increase.

7 Claims, 2 Drawing Figures

FUEL CONTROL SYSTEM FOR A RAM JET ENGINE

This invention relates to a fuel control system for a ram jet engine.

For maximum combustion efficiency of a ram jet engine it is known to be desirable that the air/fuel mixture supplied shall be substantially stoichiometric, whereby the highest possible temperature is attained within the combustion chamber. It is convenient to make fuel flow to the engine a function of the mass flow of air to the engine, so that an increase in air mass flow results in an increased fuel flow. In practice, however, a limit is set by temperature and aerodynamic considerations, and it is necessary to limit the total fuel delivered per unit mass of air when these considerations make themselves felt. Variation of fuel flow may in these conditions, be such that combustion ceases due to inadequate fuel flow and it is thus necessary to provide for re-igniting the air/fuel mixture. This ignition is commonly supplied by one or more pilot burners which must be maintained lit for the duration of engine operation.

In order to ensure that the pilot burners remain alight it is desirable that the air/fuel mixture supplied to the pilot burners shall be substantially stoichiometric at all times, irrespective of the aforesaid limiting conditions which may affect the main burners.

It is one object of the present invention to provide a ram jet fuel control system having separate controls for the main and pilot burner flows, whereby a substantially stoichiometric supply may be maintained to the pilot burners, independently of the nature of the supply to the main burners.

According to the invention a fuel control system for a ram jet engine having both main and pilot burners comprises a metering device having a first control means movable in response to an air pressure signal at the engine air intake, for controlling fuel flow to the main and pilot burners of the engine, and a second control means, movable with said first control means, for controlling fuel flow from the downstream side of said first control means to the engine pilot burners.

Figure 2:
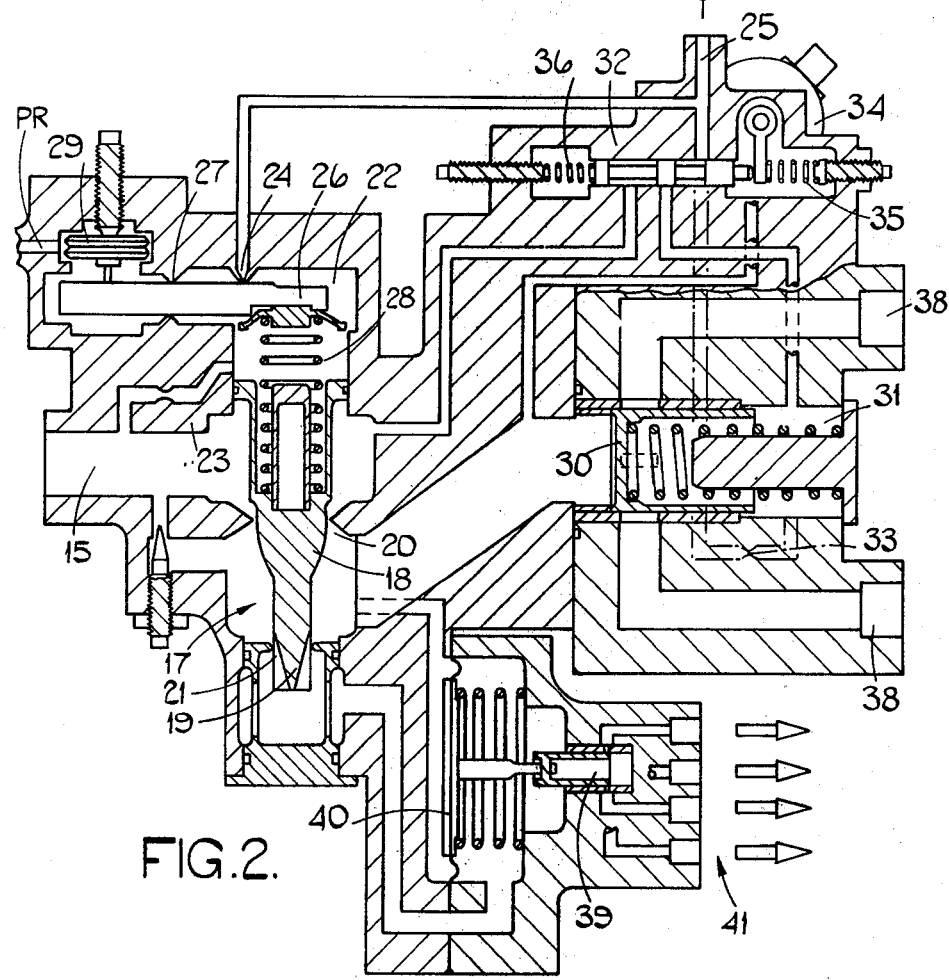

An embodiment of the invention will now be described by way of example only and with reference to the accompanying drawings in which:

FIG. 1 is a diagram of a ram jet engine and an associated fuel supply arrangement, and FIG. 2 shows, diagrammatically, a fuel control device forming part of the supply arrangement of FIG. 1.

As shown in FIG. 1 a ram jet engine 10 has a plurality of main burners 11 and a plurality of pilot burners 12. Fuel is supplied to the engine by a pump 13 driven by an air turbine (not shown) fuel flow to the engine 10 is regulated by a control device 14, shown in more detail in FIG. 2.

As shown in FIG. 2 the control device 14 has an inlet port 15 to which fuel is supplied by the pump 13. A metering device comprises a stem 17 having a first control portion 18 and a second control portion 19. The portion 18 co-operates with a surrounding annulus to define a metering orifice 20 through which substantially the whole of the fuel entering the inlet port 15 flows to the engine. The portion 19 co-operates with a further annulus to define a metering orifice 21 through which fuel from the downstream side of orifice 20 flows to the engine pilot burners.

The stem 17 is urged upwardly, as seen in the drawing, by the fuel pressure in the inlet port 15, and downwardly by a servo control pressure in a chamber 22. The pressure in chamber 22 is that intermediate a fixed restrictor 23 and a nozzle 24 arranged in series between the inlet 15 and a low pressure return line 25, flow through the nozzle 24 is regulated by a control element in the form of an arm 26 mounted for movement about a sealed pivot 27. A compression spring 28 is engaged between the arm 26 and the stem 17 to provide feedback of the stem position to the arm 26.

The arm 26 is positioned by a bellows unit 29 responsive to the pressure PR which is picked up adjacent the intake of the engine 10. The arrangement is such that an increase in pressure PR compresses the bellows unit 29, moving the arm 26 clockwise to decrease the servo pressure in chamber 22 and hence permit the stem 17 to move upwardly and thereby increase total fuel flow to the engine.

Fuel flow to the main burners 11 is also controlled by a throttle valve 30 downstream of the orifice 20, the valve 30 being responsive to an increase in pressure downstream of orifice 20 to increase fuel flow and to an increase in a servo pressure in a chamber 31 to reduce fuel flow. Chamber 31 lies between a spool valve 32 and a flow restrictor 33 connected in series between the inlet port 15 and the low pressure return line 25. The spool valve 32 is responsive to the pressure drop across orifice 20 and is also positioned by a torque motor 34 operating against a spring 35. The spool valve 32 is urged to follow movement of the torque motor by means of a further spring 36 the torque motor 34 is controlled by a circuit 37 (FIG. 1) which is responsive to an engine operating condition as for example jet pipe temperature T.

The throttle valve 30 is thus positioned in accordance with the pressure drop across the metering orifice 20, modified in accordance with temperature T, an increase in temperature T moving the spool valve 32 to the left, and thereby increasing the pressure in chamber 31 and reducing fuel flow to the main burners 11. Fuel flows from the valve 32 to the burners 11 through four outlet ports 38, only two of which are shown.

Fuel flow to the pilot burners 12 is controlled by a valve 39 which is positioned by a diaphragm 40 responsive to the pressure drop across the metering orifice 21. An increase in the pressure drop across orifice 21 moves the valve 39 in a direction to reduce fuel flow to the pilot burners 11, and thereby to restore the pressure drop to its original level. Fuel flow to the pilot burners 12 is thus a function of the flow area of the orifice 21 only. Fuel flows from the valve 39 to the pilot burners 12 by way of four outlet ports 41.

The control portion 19 of the stem 17 has a configuration such that the effective area of the orifice 21 varies with intake pressure PR so as to provide a substantially stoichiometric mixture to the pilot burners 12, and thereby maintain the pilot flame. It wll be appreciated that since the pressure drop across the orifice 21 is maintained substantially constant by the valve 39, variations in pressure downstream of the orifice 20 do not affect the mixture supplied to the burners 12.

It will be understood that the stem 17 may be positioned by an electrical actuator, instead of by the servo pressure control described above.

The pump 13 is designed to deliver a pressure which is more than adequate to ensure a desired fuel flow to both the main and pilot burners in all operating conditions. The action of the valves 30, 39 is to throttle any excess pressure which exists downstream of the respective metering orifices 20, 21. The valves 30, 39 thus have high pressure drops across their control ports, and these pressure drops ensure adequate fuel distribution to each of the passages 38 and the passages 41. A condition in which, under high g loads some of the burner outlets are starved of fuel, is thus avoided.

We claim:

1. A fuel control system for a ram jet engine having both main and pilot burners comprises a metering device having a first control means movable in response to an air pressure signal at the engine air intake, for controlling fuel flow to the main and pilot burners of the engine, and a second control means, movable with said first control means, for controlling fuel flow from the downstream side of said first control means to the engine pilot burners.

2. A system as claimed in claim 1 which includes means, responsive to an air pressure signal from the engine, for deriving a first servo control pressure from a fuel supply pressure to said system, said first and second control means being responsive to said servo control pressure.

3. A system as claimed in claim 2 which includes valve means, in series with said first control means for regulating a fuel pressure difference across said first control means.

4. A system as claimed in claim 3 in which said valve means includes means responsive to an engine temperature for causing said fuel pressure difference to be dependent on said temperature.

5. A system as claimed in claim 4 in which said valve means includes a throttle valve responsive to a second servo control pressure, and a pilot valve responsive to said pressure difference for regulating said second servo pressure, said pilot valve also being responsive to said engine temperature.

6. A system as claimed in any of claims 2 to 5 which includes a further throttle valve in series with said second control means, between said first control means and an outlet connection to said pilot burners, said further throttle valve being responsive to a fuel pressure drop across said second control means.

7. A system as claimed in claim 6 in which said second control means has a configuration such that, in all operating positions thereof, a fuel supply to the pilot burners is substantially stoichiometric.

* * * * *